Patented May 21, 1940

2,201,750

UNITED STATES PATENT OFFICE 2,201,750

MODIFIED RESINOUS CONDENSATION PRODUCTS OF METHYL VINYL KETONE AND FORMALDEHYDE, AND PROCESS OF PRODUCING SAME

Karl Vierling and Heinrich Hopff, Ludwigshafen - on - the - Rhine, Germany, assignors to I. G. Farbenindustrie Aktiengesellschaft, Frankfort-on-the-Main, Germany No Drawing. Application October 4, 1938, Serial No. 233,190. In Germany October 7, 1937

8 Claims. (Cl. 260—63)

The present invention relates to artificial resins and a process of producing same.

We have found that water-soluble condensation products of vinyl methyl ketone and formaldehyde which can be obtained by condensing vinyl methyl ketone with formaldehyde or substances acting as formaledhyde in a form slightly acid to neutral medium can be converted into valuable solid resins by heating with polybasic acids, if desired with the co-employment of monobasic acids and/or mono- or polyhydric alcohols. The production of the said water-soluble condensation products of vinyl methyl ketone and formaledehyde is described in U. S. application Serial No. 158,862, filed August 13, 1937, in the name of one of the inventors of the present application.

Suitable polybasic acids are for example phthalic acid, succinic acid, adipic acid, maleic acid, fumaric acid, diglycollic acid. Their anhydrides, chlorides, esters or amides may also be used. Suitable monobasic acids which may be co-employed are in particular the drying or non-drying fatty acids which are derived from drying or non-drying animal or vegetable oils or fats. As polyhydric alcohols there may be mentioned glycol, glycerine, pentaerythritol, sorbitol and trimethylol-propane. Partially esterified or etherified polyhydric alcohols may also be co-employed in the said reaction.

It is preferable to heat the mixtures of polybasic acids and water-soluble condensation products of vinyl methyl ketone and formaldehyde or substances acting like formaldehyde to high temperatures until the completion of the splitting off of water. In many cases it is advantageous to add acid reacting condensing agents as accelerators, such as concentrated sulphuric acid, sulphonic acids, phosphoric acid, zinc chloride or hydrogen chloride. The progress of the reaction becomes evident in an increasing thickening of the melt. When the splitting off of water is completed, the viscous resin may be poured into moulds and if desired subjected to a subsequent hardening. The properties of the resulting resins differ according to the polybasic acids employed and any monobasic acids and/or polyhydric alcohols co-employed.

The resins are usually soluble in organic solvents, as for example acetone, and may be used as lacquer resins in oil lacquers, nitrocellulose lacquers, polyvinyl ester lacquers and the like.

The following examples will further illustrate how this invention may be carried out in practice but the invention is not restricted to these examples. The parts are by weight.

Example 1

72 parts of methyl vinyl ketone are allowed to drop while stirring at a temperature below 50° C. into 150 parts of 30 per cent formaldehyde which has been practically neutralized by the addition of about 0.5 part of concentrated sodium hydroxide solution. The resulting solution is condensed to a viscous syrup by gentle heating.

70 parts of the water-soluble condensation product thus obtained are mixed with 90 parts of phthalic anhydride and 1 part of concentrated sulphuric acid and heated for from 3 to 4 hours at 160° C. The originally mobile mass gradually becomes viscous. It becomes solid on cooling. It is readily soluble in acetone and is eminently compatible with most condensation products obtained from polybasic acids and polyhydric alcohols.

If instead of phthalic anhydride equimolecular amounts of succinic acid anhydride, adipic acid, pimelic acid or suberic acid are employed, products of similar properties are obtained.

Example 2

170 parts of the water-soluble condensation products of vinyl methyl ketone and formaldehyde are heated for 3 hours at 125° C. with 150 parts of maleic anhydride and 2 parts of zinc chloride. A hard, pale resin is obtained.

Example 3

100 parts of the water-soluble condensation product of vinyl methyl ketone and formaldehyde are heated at about 200° C. with 30 parts of glycerine and 160 parts of phthalic anhydride until about 30 parts of water are distilled off and no water is further split off. A solid resin of pale brown color is thus obtained.

Example 4

100 parts of the water-soluble condensation product of vinyl methyl ketone and formaldehyde are heated at 200° C. with 120 parts of phthalic anhydride and 50 parts of linseed oil, until the splitting off of water is completed, which is the case when about 27 parts of water are distilled off. A pale brown resin is thus obtained. It is soluble in toluene and suitable for lacquers.

Example 5

100 parts of the water soluble condensation product of vinyl methyl ketone and formaldehyde are heated at 200° C. with 70 parts of phthalic anhydride and 50 parts of linoleic acid until the splitting off of water is completed. Thus 24 parts of water are distilled off. A pale brown resin insoluble in toluene is obtained.

What we claim is:

1. A process of producing artificial resins, which comprises heating water-soluble condensation products of vinyl methyl ketone and formaldehyde with a member of the group consisting of polybasic carboxylic acids and their anhydrides until the completion of the splitting off of water.

2. The process of producing artificial resins, which comprises heating water-soluble condensation products of vinyl methyl ketone and formaldehyde with anhydrides of polybasic carboxylic acids until the completion of the splitting off of water.

3. The process of producing artificial resins, which comprises heating water-soluble condensation products of vinyl methyl ketone and formaldehyde with polybasic carboxylic acids and monobasic carboxylic acids until the completion of the splitting off of water.

4. The process of producing artificial resins, which comprises heating water-soluble condensation products of vinyl methyl ketone and formaldehyde with polybasic carboxylic acids and polyvalent alcohols until the completion of the splitting off of water.

5. Artificial resins comprising the reaction products of water-soluble condensation products of methyl vinyl ketone and formaldehyde with a member of the group consisting of polybasic carboxylic acids and their anhydrides.

6. Artificial resins comprising the reaction products of water-soluble condensation products of methyl vinyl ketone and formaldehyde with anhydrides of polybasic carboxylic acids.

7. Artificial resins comprising the reaction products of water-soluble condensation products of methyl vinyl ketone and formaldehyde with polybasic carboxylic acids and monobasic carboxylic acids.

8. Artificial resins comprising the reaction products of water-soluble condensation products of methyl vinyl ketone and formaldehyde with polybasic carboxylic acids and polyvalent alcohols.

KARL VIERLING.
HEINRICH HOPFF.